United States Patent
Kageyama et al.

(10) Patent No.: US 12,091,586 B2
(45) Date of Patent: Sep. 17, 2024

(54) TWO-PACK CURABLE ADHESIVE COMPOSITION

(71) Applicant: THE YOKOHAMA RUBBER CO., LTD., Tokyo (JP)

(72) Inventors: Hirokazu Kageyama, Hiratsuka (JP); Kazushi Kimura, Hiratsuka (JP); Yutaro Yamamoto, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 807 days.

(21) Appl. No.: 17/279,922

(22) PCT Filed: Sep. 27, 2019

(86) PCT No.: PCT/JP2019/038405
§ 371 (c)(1),
(2) Date: Mar. 25, 2021

(87) PCT Pub. No.: WO2020/067533
PCT Pub. Date: Apr. 2, 2020

(65) Prior Publication Data
US 2021/0340418 A1 Nov. 4, 2021

(30) Foreign Application Priority Data
Sep. 28, 2018 (JP) ................. 2018-185934

(51) Int. Cl.
*C09J 175/08* (2006.01)
*C08G 18/10* (2006.01)
(Continued)

(52) U.S. Cl.
CPC ............ *C09J 175/08* (2013.01); *C08G 18/10* (2013.01); *C08G 18/1816* (2013.01);
(Continued)

(58) Field of Classification Search
CPC .......... C09J 175/08; C09J 11/06; C09J 11/04; C08G 18/10; C08G 18/1816;
(Continued)

(56) References Cited

U.S. PATENT DOCUMENTS

| | | |
|---|---|---|
| 2012/0295104 A1 | 11/2012 | Barker |
| 2013/0059973 A1 | 3/2013 | Wamprecht et al. |
| 2019/0136105 A1 | 5/2019 | Abe et al. |

FOREIGN PATENT DOCUMENTS

| | | |
|---|---|---|
| CN | 102272184 A | 12/2011 |
| JP | 862-191076 A | 8/1987 |

(Continued)

*Primary Examiner* — John E Uselding
(74) *Attorney, Agent, or Firm* — Carrier, Shende & Associates P.C.; Joseph P. Carrier; Fulchand P. Shende

(57) ABSTRACT

The two-part curable adhesive composition contains a main agent (A) containing a urethane prepolymer (a1) and a residual polyisocyanate (a2), and a curing agent (B) containing a polyol compound (b1) and a polyamine compound (b2). The urethane prepolymer (a1) is made by reacting in an equivalent ratio of an isocyanate group in a raw material polyisocyanate to a hydroxy group in a polytetramethylene ether glycol being 2.05 or greater. The equivalent ratio of an isocyanate group in the main agent (A) to an active hydrogen group in the curing agent (B) is from 0.5 to 4.

14 Claims, 1 Drawing Sheet

(51) Int. Cl.
*C08G 18/18* (2006.01)
*C08G 18/48* (2006.01)
*C08G 18/76* (2006.01)
*C08K 3/04* (2006.01)
*C08K 3/26* (2006.01)
*C08K 3/36* (2006.01)
*C08K 5/12* (2006.01)
*C08K 13/02* (2006.01)
*C09J 11/04* (2006.01)
*C09J 11/06* (2006.01)

(52) U.S. Cl.
CPC ..... *C08G 18/4829* (2013.01); *C08G 18/4845* (2013.01); *C08G 18/4854* (2013.01); *C08G 18/7671* (2013.01); *C08K 3/04* (2013.01); *C08K 3/26* (2013.01); *C08K 3/36* (2013.01); *C08K 5/12* (2013.01); *C08K 13/02* (2013.01); *C09J 11/04* (2013.01); *C09J 11/06* (2013.01); *C08K 2003/265* (2013.01); *C08K 2201/014* (2013.01); *C09J 2475/00* (2013.01)

(58) Field of Classification Search
CPC ............ C08G 18/4829; C08G 18/4845; C08G 18/4854; C08G 18/7671; C08K 3/04; C08K 3/26; C08K 3/36; C08K 5/12
See application file for complete search history.

(56) References Cited

FOREIGN PATENT DOCUMENTS

| | | |
|---|---|---|
| JP | 2014-522426 A | 9/2014 |
| JP | 2017-218539 A | 12/2017 |
| JP | 2018-135491 A | 8/2018 |

(a)
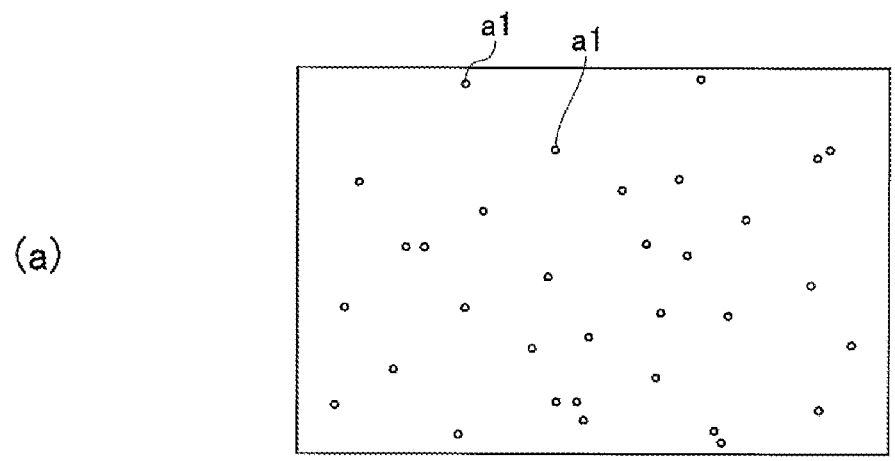
(b)
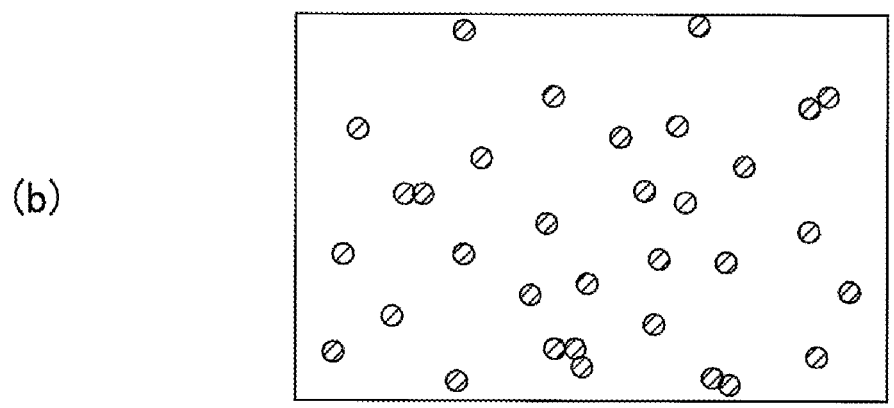
(c)
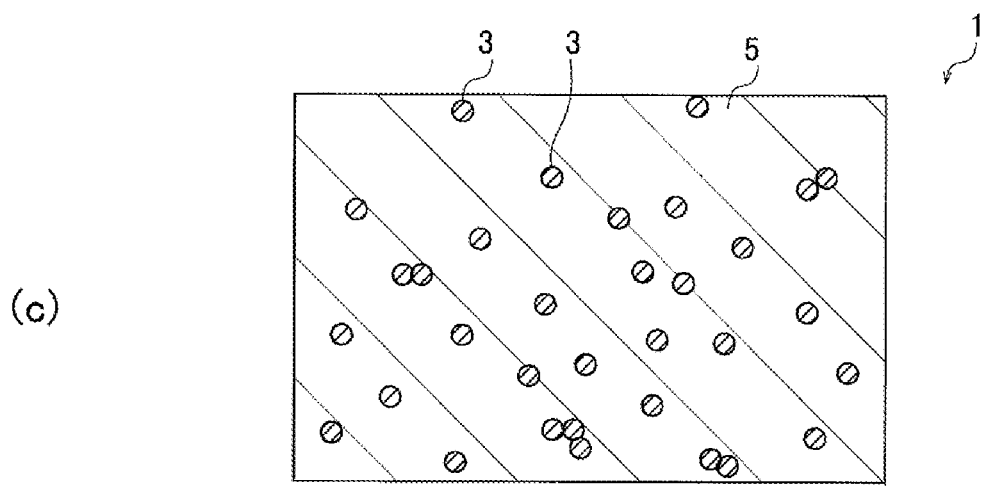

TWO-PACK CURABLE ADHESIVE COMPOSITION

TECHNICAL FIELD

The present invention relates to a two-part curable adhesive composition having a main agent and a curing agent.

BACKGROUND ART

For structures such as bodies of automobiles, components formed from different materials may be bonded using adhesives. By bonding using adhesives, even when a difference in coefficients of thermal expansion of components is large, occurrence of strain and warp is suppressed. Meanwhile, an adhesive for such use is required to have excellent tensile properties including good strength at break and elongation at break once the adhesive is in a cured state.

As an adhesive composition having excellent elongation at break, a two-part curable adhesive composition containing a main agent containing a urethane prepolymer, and a curing agent has been known. In a two-part curable adhesive composition, typically, a compounded ratio of a main agent to a curing agent is adjusted such that an equivalent ratio of an isocyanate group contained in the main agent to a hydroxy group in polyols contained in the curing agent is approximately 1. However, when the amounts of the isocyanate group and the hydroxy group are close to equal, the curing rate of the urethane prepolymer becomes significantly slow. Therefore, an increase of the curing rate has been attempted by using a catalyst such as organometal compounds and tertiary amines (Patent Document 1).

CITATION LIST

Patent Document
Patent Document 1: JP 2017-218539 A

SUMMARY OF INVENTION

Technical Problem

When curing of the adhesive composition is made fast by using the catalyst described above, foaming may occur, and by this, problems of decrease in tensile properties of the cured product may arise. Furthermore, by allowing the mixing ratio of a main agent to a curing agent to be deviated from a set value, predetermined physical properties of the cured product may not be achieved, and the tensile properties such as strength at break and elongation at break may be deteriorated.

An object of the present invention is to provide a two-part curable adhesive composition that suppresses foaming, provides its cured product having excellent strength at break and elongation at break, and has less effect on strength at break of the cured product even when a mixing ratio of a main agent to a curing agent is deviated from a set value. Furthermore, another object is to provide a two-part curable adhesive composition that can adjust elastic modulus and elongation at break while strength at break of its cured product is maintained when a mixing ratio of a main agent to a curing agent is intentionally changed.

Solution to Problem

An aspect of the present invention is a two-part curable adhesive composition including a main agent (A) containing a urethane prepolymer (a1), and a curing agent (B) containing a polyol compound (b1) and a polyamine compound (b2), the urethane prepolymer (a1) being made by reacting a raw material polyisocyanate and a polytetramethylene ether glycol in an equivalent ratio of an isocyanate group in the raw material polyisocyanate to a hydroxy group in the polytetramethylene ether glycol being 2.05 or greater, with all of the polytetramethylene ether glycol turning to a monomer unit for the urethane prepolymer (a1), the main agent (A) further containing, in addition to the urethane prepolymer (a1), a residual polyisocyanate (a2) which is a remainder of the raw material polyisocyanate that did not react with the polytetramethylene ether glycol, and an equivalent ratio of an isocyanate group in the main agent (A) to all active hydrogen groups in the curing agent (B) being from 0.5 to 4.

Preferably, an equivalent ratio of an active hydrogen group in the polyamine compound (b2) to an active hydrogen group in the polyol compound (b1) is from 1.5 to 6, and an equivalent ratio of an isocyanate group in the main agent (A) to an amino group in the polyamine compound (b2) is from 0.8 to 4.

A number average molecular weight of the polytetramethylene ether glycol is preferably 500 or greater.

A number average molecular weight of the polyol compound (b1) is preferably 500 or greater.

The polyol compound (b1) preferably contains at least one selected from the group consisting of a monomer unit of polyethylene glycol and a monomer unit of polypropylene glycol in each molecule.

The polyamine compound (b2) preferably has a number average molecular weight of less than 500 and preferably has at least two amino groups and at least one aromatic group in each molecule.

The main agent (A) preferably contains at least one selected from the group consisting of a filler, an anti-aging agent, a coloring agent, a viscosity modifier, and a plasticizer.

The curing agent (B) preferably contains at least one selected from the group consisting of a filler, an anti-aging agent, a coloring agent, a viscosity modifier, a plasticizer, and a polyhydric alcohol having a number average molecular weight of less than 500.

Preferably, a cured product obtained by curing the two-part curable adhesive composition has a tensile strength of 15 MPa or greater and an elongation at break of 150% or greater, as determined in accordance with JIS K6251.

Preferably, a cured product obtained by curing the two-part curable adhesive composition has a modulus of elasticity in tension of 50 MPa or greater.

A mass ratio of the main agent (A) to the curing agent (B) is preferably from 3:7 to 7:3, and more preferably from 4:6 to 6:4.

The two-part curable adhesive composition has a workable life of preferably from 30 seconds to 10 minutes.

Another aspect of the present invention is a two-part curable adhesive composition including a main agent (A) containing a urethane prepolymer (a1), and a curing agent (B) containing a polyol compound (b1) and a polyamine compound (b2), the urethane prepolymer (a1) being made by reacting a raw material polyisocyanate and a polytetramethylene ether glycol in an equivalent ratio of an isocyanate group in the raw material polyisocyanate to a hydroxy group in the polytetramethylene ether glycol being approximately 1, the main agent (A) further containing, in addition to the urethane prepolymer (a1), a residual polyisocyanate (a2) which is a remainder of the raw material polyisocyanate that did not react with the polytetramethylene ether glycol and an equivalent ratio of an isocyanate group in the main agent (A) to an active hydrogen group in the curing agent (B) being from 0.5 to 4.

Another aspect of the present invention is a method of producing a two-part curable adhesive composition, the method including manufacturing a main agent (A) containing a urethane prepolymer (a1), and manufacturing a curing agent (B) containing a polyol compound (b1) and a polyamine compound (b2), in the manufacturing of the main agent (A), the urethane prepolymer (a1) being manufactured by reacting a raw material polyisocyanate and a polytetramethylene ether glycol in an equivalent ratio of an isocyanate group in the raw material polyisocyanate to a hydroxy group in the polytetramethylene ether glycol being 2.05 or greater with all of the polytetramethylene ether glycol turning to a monomer unit for the urethane prepolymer (a1), the main agent (A) further containing, in addition to the urethane prepolymer (a1), a residual polyisocyanate (a2) which is a remainder of the raw material polyisocyanate that did not react with the polytetramethylene ether glycol, and an equivalent ratio of an isocyanate group in the main agent (A) to all active hydrogen groups in the curing agent (B) being from 0.5 to 4.

Advantageous Effects of Invention

According to the two-part curable adhesive composition of the embodiments described above, foaming can be suppressed, a cured product having excellent strength at break and elongation at break can be obtained, and less effect occurs on strength at break of the cured product even when a mixing ratio of a main agent to a curing agent is deviated from a set value. Furthermore, by intentionally changing the mixing ratio of the main agent to the curing agent, adjustment to obtain a cured product having a low elastic modulus and being flexible and having a large elongation, or adjustment to obtain a cured product having a small elongation and a high elastic modulus and being hard becomes possible.

BRIEF DESCRIPTION OF DRAWINGS

FIGS. 1(a) to 1(c) are figures conceptually illustrating a curing reaction of an adhesive composition.

DESCRIPTION OF EMBODIMENTS

The two-part curable adhesive composition of the present embodiment will be described below. The present embodiment includes various embodiments described below.
Adhesive Composition The two-part curable adhesive composition of the present embodiment (hereinafter, also simply referred to as "adhesive composition") contains a main agent (A) and a curing agent (B).
Main Agent (A)

The main agent (A) contains a urethane prepolymer (a1).

The urethane prepolymer (a1) is made by reacting a raw material polyisocyanate and a polytetramethylene ether glycol (PTMG). That is, the urethane prepolymer (a1) has a monomer unit of polyisocyanate and a monomer unit of polytetramethylene ether glycol (PTMG). Specifically, this reaction is performed in a manner that the equivalent ratio of an isocyanate group in a raw material polyisocyanate to hydroxy groups in a polytetramethylene ether glycol (PTMG) (hereinafter, also referred to as "index") is 2.05 or greater and all of the polytetramethylene ether glycol (PTMG) turns to a monomer unit for the urethane prepolymer (a1).

By setting the index to 2.05 or greater, a cured product having excellent strength at break, specifically a cured product having a strength at break of 15 MPa or greater, can be obtained. In the present specification, the strength at break refers to a tensile strength in accordance with JIS K6251.

Furthermore, by setting the index to be 2.05 or greater and setting an excessively large amount of the isocyanate group with respect to the amount of the hydroxy group, a component that is different from the polytetramethylene ether glycol (PTMG), specifically, the polyol compound (b1) and the polyamine compound (b2) described below, can be adequately reacted with the remaining isocyanate groups. By this, a cured product having excellent strength at break, specifically, a cured product having a strength at break of 15 MPa or greater, and preferably a cured product having a strength at break of 15 MPa or greater and an elongation at break of 150% or greater, can be obtained. In the present specification, the elongation at break refers to an elongation at break in accordance with JIS K6251.

Note that, by the adhesive composition of the present embodiment, a product obtained by adding the polytetramethylene ether glycol (PTMG) to the isocyanate and then reacting with active hydrogen groups of the curing agent (B) and a product obtained by reacting the remaining isocyanate that did not react with the polytetramethylene ether glycol (PTMG) with active hydrogen groups of the curing agent (B) are formed, and a polymer blend in which polymer phases with different properties coexist can be obtained.

The equivalent ratio is preferably 3 or greater, and more preferably 4 or greater. Meanwhile, when the equivalent ratio is too large, adjustment of reaction rate, strength at break, and elongation at break, and suppression of foaming become difficult. Therefore, it is preferable that the equivalent ratio is 12 or less, and preferably 10 or less.

The raw material polyisocyanate is not particularly limited as long as the raw material polyisocyanate has two or more isocyanate groups in each molecule. As the raw material polyisocyanate, a known polyisocyanate compound can be used.

Specific examples of the polyisocyanate compound used for the raw material polyisocyanate include aromatic polyisocyanates such as TDI (e.g. 2,4-tolylene diisocyanate (2,4-TDI) and 2,6-tolylene diisocyanate (2,6-TDI)), MDI (e.g. 4,4'-diphenylmethane diisocyanate (4,4'-MDI) and 2,4'-diphenylmethane diisocyanate (2,4'-MDI)), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic polyisocyanates such as pentamethylene diisocyanate (PDI), hexamethylene diisocyanate (HDI), trimethylhexamethylene diisocyanate (TMHDI), lysine diisocyanate, and norbornane diisocyanate (NBDI); alicyclic polyisocyanates such as transcyclohexane-1,4-diisocyanate, isophorone diisocyanate (IPDI), bis(isocyanate methyl)cyclohexane ($H_6XDI$), and dicyclohexylmethane diisocyanate ($H_{12}MDI$); carbodiimide-modified polyisocyanates thereof; and isocyanurate-modified polyisocyanates thereof.

Such polyisocyanate may be used alone, or a combination of two or more types of these polyisocyanates may be used.

Among these, an aromatic polyisocyanate is preferable, and MDI is more preferable, from the perspective of excellent curability.

The polytetramethylene ether glycol (PTMG) is a polyether glycol having primary hydroxy groups at both terminals, and a known polytetramethylene ether glycol (PTMG) can be used without particular limitation.

The number average molecular weight of the polytetramethylene ether glycol (PTMG) is preferably 500 or greater. When the number average molecular weight of the polytetramethylene ether glycol (PTMG) is less than 500, the elongation at break of the cured product is reduced, and the cured product may become too hard. Furthermore, even when the equivalent ratio (NCO group/active hydrogen group ratio) described below is adjusted, adjustment of a modulus of elasticity in tension (hereinafter, also simply referred to as "elastic modulus") of the cured product becomes difficult. The upper limit value of the number average molecular weight of the polytetramethylene ether glycol (PTMG) is, for example, 3000.

The number average molecular weight of the urethane prepolymer (a1) is preferably from 1000 to 15000, and more preferably from 1000 to 10000.

Note that the number average molecular weight is a number average molecular weight (based on calibration with polystyrene) measured by gel permeation chromatography (GPC), and for the measurement, use of tetrahydrofuran (THF) and/or N,N-dimethylformamide (DMF) as a solvent is preferred.

The main agent (A) further contains a residual polyisocyanate (a2) in addition to the urethane prepolymer (a1).

The residual polyisocyanate (a2) is a remainder of the raw material polyisocyanate that did not react with the polytetramethylene ether glycol (PTMG). By allowing the main agent (A) to contain the residual polyisocyanate (a1), reaction with the curing agent (B) can be quickly performed. In this way, the curing time can be shortened, and foaming caused by a reaction of the residual polyisocyanate (a1) and moisture can be suppressed.

Curing Agent (B)

The curing agent (B) contains a polyol compound (b1) and a polyamine compound (b2).

By allowing the curing agent (B) to contain the polyol compound (b1), the elongation at break of the cured product can be enhanced. Furthermore, the polyol compound (b1) gradually reacts with a polyisocyanate compared to the polyamine compound (b2), and thus does not lead to an excessively short curing time and contributes to enhancement of workability.

The polyol compound (b1) is not particularly limited as long as the polyol compound (b1) has two or more hydroxy groups in each molecule, and a known polyol compound can be used. Specific examples of the polyol compound include low-molecular-weight polyhydric alcohols, polyether polyols, polyester polyols, other types of polyols, and polyol mixtures thereof.

Specific examples of the low-molecular-weight polyhydric alcohols include low-molecular-weight polyols such as ethylene glycol (EG), diethylene glycol, propylene glycol (PG), dipropylene glycol, 1,3-butanediol, 1,4-butanediol, pentanediol, neopentyl glycol, hexanediol, cyclohexanedimethanol, glycerin, 1,1,1-trimethylolpropane (TMP), 1,2,5-hexanetriol, and pentaerythritol; sugars such as sorbitol; and the like.

Examples of the polyether polyols include polyols obtained by adding at least one type selected from styrene oxide and/or alkylene oxides such as ethylene oxide, propylene oxide, butylene oxide (tetramethylene oxide), and tetrahydrofuran, to at least one type selected from the compounds that are exemplified as the low-molecular-weight polyhydric alcohols described above.

Specific examples of the polyether polyol include polyethylene glycol, polypropylene glycol (PPG), polypropylene triol, ethylene oxide/propylene oxide copolymers, polytetramethylene ether glycol (PTMG), polytetraethylene glycol, and sorbitol polyol.

Likewise, examples of the polyester polyol include the condensation products (condensed polyester polyols) of any of the low-molecular-weight polyhydric alcohols with a polybasic carboxylic acid; lactone polyols; and polycarbonate polyols.

Specific examples of the polybasic carboxylic acids which may be used here to form the condensed polyester polyol include glutaric acid, adipic acid, azelaic acid, fumaric acid, maleic acid, pimelic acid, suberic acid, sebacic acid, phthalic acid, terephthalic acid, isophthalic acid, dimer acid, pyromellitic acid, other low-molecular-weight carboxylic acids, oligomeric acids, castor oil, and hydroxycarboxylic acids such as a reaction product of castor oil with ethylene glycol (or propylene glycol).

In addition, specific examples of the lactone polyols include compounds that are obtained by ring-opening polymerization of a lactone such as ε-caprolactone, α-methyl-ε-caprolactone, or ε-methyl-ε-caprolactone with a suitable polymerization initiator, and that have hydroxy groups at both ends.

Specific examples of other polyols include polymeric polyols having carbon-carbon bonds on a main-chain skeleton, such as acrylic polyols, polybutadiene diols, and hydrogenated polybutadiene polyols.

For the polyol compound (b1), various polyol compounds exemplified above may be used alone or may be used in a combination of two or more types.

The polyol compound (b1) may contain a polytetramethylene ether glycol (PTMG).

The number average molecular weight of the polyol compound (b1) is preferably 500 or greater. When the number average molecular weight of the polyol compound (b1) is less than 500, the elongation at break of the cured product is reduced, and the cured product may become too hard.

The polyol compound (b1) preferably contains at least one of polyethylene glycols and/or polypropylene glycols. Furthermore, the polyol compound (b1) preferably contains a primary hydroxy group at a terminal.

Because the polyamine compound (b2) exhibits high reaction rate in a reaction with the polyisocyanate, the reaction with the residual polyisocyanate (a2) progresses rapidly. Furthermore, because of heat generation caused by the reaction between the polyamine compound (b2) and the residual polyisocyanate (a2), a following reaction of the polyol compound (b1) and the residual polyisocyanate (a2) and the urethane prepolymer (a1) is promoted. In this way, curing time is shortened, and an effect of shortening workable life is achieved.

The polyamine compound (b2) is not particularly limited as long as the polyamine compound (b2) has two or more amino groups in each molecule, and a known polyamine compound can be used.

Specific examples of the polyamine compound (b2) include aliphatic polyamines such as ethylenediamine, propylenediamine, butylenediamine, diethylenetriamine, triethylenetriamine, triethylenetetramine, tetraethylenepentamine, pentaethylenehexamine, hexamethylenediamine, trimethylhexamethylenediamine, 1,2-propanediamine, iminobispropylamine, methyliminobispropylamine, and 1,5-diamino-2-methylpentane (MPMD, available from Dupont K.K.); aromatic polyamines such as meta-phenylenediamine, ortho-phenylenediamine, para-phenylenediamine, m-xylylenediamine (MXDA), diaminodiphenyl methane, diaminodiphenyl sulfone, diamino diethyldiphenylmethane, diethylmethylbenzenediamine, 2-methyl-4,6-bis(methylthio)-1,3-benzenediamine, 4,4'-methylenebis(2-chloroaniline), 4,4'-methylenebis(3-chloro-2,6-diethylaniline), trimethylene bis(4-aminobenzoate), and bis(4-amino-2,3-dichlorophenyl)methane; N-aminoethylpiperazine; monoamine having an ether bond in its main chain, such as 3-butoxyisopropylamine; diamines having a polyether backbone, that is exemplified by JEFFAMINE EDR148 available from Sun Techno Chemicals Co., Ltd.; alicyclic polyamines such as isophoronediamine, 1,3-bisaminomethylcyclohexane (1,3BAC, available from Mitsubishi Gas Chemical Company, Inc.), 1-cyclohexylamino-3-aminopropane, and 3-aminomethyl-3,3,5-trimethyl-cyclohexylamine; diamines having a norbornane backbone, such as norbornanediamine (NBDA, available from Mitsui Chemicals, Inc.); polyamide amines having an amino group at a molecular end of polyamide; 2,5-dimethyl-2,5-hexamethylene diamine, menthenediamine, 1,4-bis(2-amino-2-methylpropyl)piperazine, JEFFAMINE D230 and JEFFAMINE D400, available from Sun Techno Chemicals Co., Ltd., having polypropylene glycol (PPG) as a backbone. These polyamine compounds may be used alone or may be used in a combination of two or more types.

From the perspective of increasing the reaction rate with the residual polyisocyanate (a2), the polyamine compound (b2) preferably has a number average molecular weight of less than 500 and preferably has at least two amino groups and at least one aromatic group in each molecule.

The equivalent ratio of the amino groups in the polyamine compound (b2) to the hydroxy groups in the polyol compound (b1) (hereinafter, also referred to as "amino group/hydroxy group ratio") is preferably from 1.5 to 6. In this way, the workable life of the adhesive composition can be made to a more appropriate duration. The equivalent ratio is preferably from 2 to 6.

The equivalent ratio of the isocyanate group in the main agent (A) to the amino group in the polyamine compound (b2) (hereinafter, also referred to as "isocyanate group/amino group ratio") is preferably from 0.8 to 4. When the isocyanate group/amino group ratio is less than 0.8, an opportunity for the isocyanate group of the residual polyisocyanate (a2) to react with the hydroxy group of the polyol compound (b1) becomes less, and the elongation at break of the cured product is less likely to be enhanced. On the other hand, when the isocyanate group/amino group ratio is greater than 4, the curing rate of the adhesive composition becomes slow, and the possibility of occurrence of foaming is increased.

In the adhesive composition of the present embodiment, the equivalent ratio of the isocyanate group in the main agent (A) to all the active hydrogen groups in the curing agent (B) (hereinafter, also referred to as "NCO group/active hydrogen group ratio") is from 0.5 to 4. The active hydrogen groups refer to hydroxy groups in the polyol compound (b1) and amino groups in the polyamine compound (b2). The isocyanate group in the main agent (A) refers to isocyanate group in the urethane prepolymer (a1) and the residual polyisocyanate (a2).

When the NCO group/active hydrogen group ratio is varied in a range of 0.5 to 4, the elastic modulus and the elongation at break (elongation) can be adjusted without significantly changing the strength at break of the cured product. Therefore, depending on the use, by adjusting the NCO group/active hydrogen group ratio, a cured product having target elastic modulus and elongation at break (elongation) can be obtained. Meanwhile, even when the NCO group/active hydrogen group ratio is changed, the strength at break of the cured product does not significantly change. Specifically, the percentage of change of the strength at break is suppressed to not greater than ±10% relative to the strength at break of the cured product manufactured by mixing the main agent (A) and the curing agent (B) in a mixing ratio (mass ratio) of a set value (e.g. 1:1). As described above, even when the mixing ratio of the main agent (A) to the curing agent (B) is deviated from the set value, the strength at break of the cured product does not change significantly, and thus the elastic modulus and the elongation at break (elongation) can be adjusted while the high strength at break is maintained.

When the NCO group/active hydrogen group ratio is greater than 4, while the elastic modulus of the cured product becomes high, the elongation at break becomes excessively small, and the cured product becomes excessively hard. When the NCO group/active hydrogen group ratio is less than 0.5, while the elongation at break of the cured product becomes high, the elastic modulus becomes excessively small, and the cured product becomes excessively flexible.

The mass ratio of the main agent (A) to the curing agent (B) is preferably from 3:7 to 7:3. According to the adhesive composition of the present embodiment, even when the mixing ratio of the main agent (A) to the curing agent (B) is, for example, deviated by such a range from 1:1, the effect on the strength at break of the cured product is significantly small as described above.

The main agent (A) and the curing agent (B) described above each may contain, if necessary, various additives such as fillers, curing catalysts, plasticizers, anti-aging agents, antioxidants, pigments (dyes), thixotropic agents, ultraviolet absorbers, flame retardants, surfactants (including leveling agents), dispersing agents, dehydrating agents, adhesion promoters, and antistatic agents, in a range that does not impair the object of the present invention.

Specifically, the main agent (A) preferably contains at least one selected from the group consisting of fillers, anti-aging agents, coloring agents, viscosity modifiers, and plasticizers.

Specifically, the curing agent (B) preferably contains at least one selected from the group consisting of fillers, anti-aging agents, coloring agents, viscosity modifiers, plasticizers, and polyhydric alcohols having a number average molecular weight of less than 500. As the polyhydric alcohols having a number average molecular weight of less than 500, for example, the low-molecular-weight polyhydric alcohols described above can be used.

The adhesive composition does not need to use a catalyst such as an organometal compound or a tertiary amine. That is, according to an embodiment, the adhesive composition preferably contains no catalyst such as an organometal compound or a tertiary amine.

With reference to FIG. 1, the curing reaction of the adhesive composition will be described. FIG. 1 is figures conceptually illustrating the curing reaction of the adhesive composition. From the time of mixing the two parts, as the curing reaction progresses, the polyisocyanate compound reacts with the polyamine compound and the polyols in the main agent and the curing agent and, for example, undergoes phase separation, forms hard segments and soft segments, and thus, forms a final state (cured product) in any one of the conditions schematically illustrated in FIGS. 1(a) to (c). In the figures, particulate elements are hard segments, and due to change in the composition, the mixing ratio, or the like, the particulate elements appear in different forms, such as aggregations with urethane bonding and the like, and microparticles in a size of spherocrystals to micrometer scale. Note that a hard segment is represented by the reference sign "a1" in FIG. 1(a) and by the reference sign "3" in FIG. 1(c). Furthermore, in FIG. 1(c), a soft segment is represented by the sign 5, and a cured product is represented by the sign 1.

According to the adhesive composition of the present embodiment, foaming can be suppressed, a cured product having excellent strength at break and elongation at break can be obtained, and less effect occurs on the strength at break of the cured product when the mixing ratio of the main agent to the curing agent is deviated from a set value. Specifically, as the cured product having excellent tensile properties, a cured product having a strength at break of 15 MPa or greater, and preferably a cured product having a strength at break of 15 MPa or greater and an elongation at break of 150% or greater, can be obtained. With such tensile properties, the strength at break is at equivalent or to a degree that corresponds to the strength at break of an epoxy resin-based adhesive while the elongation at break is equivalent to that of a polyurethane-based adhesive in the related art. Furthermore, according to the adhesive composition of the present embodiment, a cured product having the elastic modulus of 50 MPa or greater is obtained. The cured product having the tensile properties described above is suitable for bonding components of structures, such as bodies of automobiles.

The strength at break is preferably 20 MPa or greater, and more preferably 25 MPa or greater. The upper limit value of the strength at break is not particularly limited and, for example, is approximately 100 MPa.

The elongation at break is preferably 200% or greater, and more preferably 250% or greater. The upper limit value of the elongation at break is not particularly limited and, for example, is approximately 500%.

The elastic modulus is preferably 50 MPa or greater, and more preferably 100 or greater. The upper limit value of the elastic modulus is not particularly limited, and, for example, is approximately 450 MPa.

Note that the elastic modulus can be determined by the modulus of elasticity in tension (MPa) in accordance with JIS K7161 except, for strains ε1 and ε2, ε1 is set to 0% and ε2 is set to 2.0%. Specifically, when σ1 and σ2 are stresses (MPa) corresponding to the strains at these two points, the elastic modulus is a value obtained by dividing a difference of stresses (σ2−σ1) by a difference of strains (ε2−ε1).

According to the present embodiment, the workable life of the adhesive composition is from 30 seconds to 10 minutes. Because the workable life is 10 minutes or less, excellent workability is achieved, and foaming can be suppressed. Because the workable life is 30 seconds or more, the curing time is not excessively short, and excellent workability is achieved. The workable life refers to a time period from the time at which mixing of the main agent (A) and the curing agent (B) is started to the time at which handling becomes impossible.

The workable life is preferably not longer than 7 minutes, and more preferably not longer than 5 minutes.

According to the adhesive composition of the present embodiment, the flow starting temperature of the cured product is 130° C. or higher, and preferably 150° C. or higher, a cured product having excellent heat resistance is obtained. The flow starting temperature is measured by using a flow tester.

The adhesive composition of the present embodiment is used for bonding components of various structures, which are not limited to, for example, bodies of automobiles. Furthermore, the adhesive composition of the present embodiment can be used as, for example, a coating material, a waterproof material, a floor material, an elastomer, an artificial leather, and spandex, in addition to an adhesive.

Method of Producing Adhesive Composition

The method of producing the adhesive composition of an embodiment includes a step of manufacturing a main agent (A) and a step of manufacturing a curing agent (B).

In the step of manufacturing the main agent (A), a urethane prepolymer (a1) is made by reacting a raw material polyisocyanate and a polytetramethylene ether glycol (PTMG) in a manner that the isocyanate group in the raw material polyisocyanate is in an amount greater than the amount of the hydroxy group in the polytetramethylene ether glycol (PTMG) so that all of the polytetramethylene ether glycol turns to a monomer unit for the urethane prepolymer (a1). By this, the main agent (A) containing the urethane prepolymer (a1) and the residual polyisocyanate (a2) is manufactured. Note that the raw material polyisocyanate, the polytetramethylene ether glycol (PTMG), the urethane prepolymer (a1), and the residual polyisocyanate (a2) are, respectively, configured identical to the raw material polyisocyanate, the polytetramethylene ether glycol (PTMG), the urethane prepolymer (a1), and the residual polyisocyanate (a2) described above.

The index during manufacturing of the urethane prepolymer (a1) is adjusted in a manner that the tensile strength of the cured product obtained by curing the two-part curable adhesive composition becomes 15 MPa or greater and the elongation at break becomes 150% or greater, determined in accordance with JIS K6251. In other words, the index is adjusted to 2.05 or greater.

In the step of manufacturing the curing agent (B), the curing agent (B) containing a polyol compound (b1) and a polyamine compound (b2) is manufactured. At this time, the equivalent ratio of isocyanate groups in the main agent (A) to active hydrogen groups in the curing agent (B) is adjusted to from 0.5 to 4. Note that the polyol compound (b1) and the polyamine compound (b2) are, respectively, configured identical to the polyol compound (b1) and the polyamine compound (b2) described above.

Using the production method described above, the adhesive composition described above can be manufactured.

Experiment

To study the effects of the embodiments of the present invention, adhesive compositions were produced based on the blended amounts listed in Table 1 to Table 3, and elastic modulus, strength at break, elongation at break, workable life, and foamability were measured.

Urethane prepolymers 1 to 3 were produced as described below, additives listed in Tables were added, and main agents were produced. Furthermore, the raw materials listed in Tables were mixed, and thus curing agents were produced.

Synthesis of Urethane Prepolymer 1

The urethane prepolymer 1 was synthesized by agitating to react 100 g of polytetramethylene ether glycol and 100 g of 4,4'-diphenylmethane diisocyanate (index: 4.0) in a nitrogen atmosphere at 80° C. for 4 hours.

Synthesis of Urethane Prepolymer 2

The urethane prepolymer 2 was synthesized by agitating to react 100 g of polytetramethylene ether glycol and 150 g of 4,4'-diphenylmethane diisocyanate (index: 6.0) in a nitrogen atmosphere at 80° C. for 4 hours.
Synthesis of Urethane Prepolymer 3

The urethane prepolymer 3 was synthesized by agitating to react 100 g of polytetramethylene ether glycol and 50 g of 4,4'-diphenylmethane diisocyanate (index: 2.0) in a nitrogen atmosphere at 80° C. for 4 hours.

For the polytetramethylene ether glycol and the 4,4'-diphenylmethane diisocyanate used in the production of the urethane prepolymers 1 to 3 described above, the following materials were used.

Polytetramethylene ether glycol:
PTMG 1000 (weight average molecular weight: 1000), available from Mitsubishi Chemical Corporation
4,4'-Diphenylmethane diisocyanate:
Millionate MT (molecular weight: 250), available from Tosoh Corporation In Tables, each value for the urethane prepolymers 1 to 3 shows a total amount of the urethane prepolymer (a1) and the residual polyisocyanate (a2). For the raw materials other than the urethane prepolymers 1 to 3 listed in Tables, the materials listed below were used. In Tables, the amount of a raw material is shown in parts by mass.

Carbon black: 200 MP, available from NSCC Carbon Co., Ltd.
Calcium carbonate 1: heavy calcium carbonate, Super S, available from Maruo Calcium Co., Ltd.
Plasticizer: diisononyl phthalate, available from J-PLUS Co., Ltd.
Polyol 1: polyoxyethylene polyoxypropylene glycol (polyol in which, to glycerin, PO(1,2-propylene oxide)-EO(ethylene oxide)-PO(1,2-propylene oxide) were block-added in this order), SANNIX PL-2100, available from Sanyo Chemical Industries, Ltd.
Polyol 2: polyether polyol, SANNIX KC-745, available from Sanyo Chemical Industries, Ltd.
Polyamine: diethylmethylbenzenediamine, DETDA, available from Mitsui Fine Chemicals, Inc.
Calcium carbonate 2: light calcium carbonate, KALFAIN 200, available from Maruo Calcium Co., Ltd.
Silica: Reolosil QS-102, available from Tokuyama Corporation In Tables, "main agent (A):curing agent (B)" means a mass ratio of the main agent to the curing agent, and is represented by a ratio of which the total mass of the main agent and the curing agent is 2.

In Examples 1, 2, and 5, a curing agent was mixed into each urethane prepolymer by following a standard formulation. In other words, the main agent (A) and the curing agent (B) were mixed in a mixing ratio of 1:1. In Examples 3 and 4, the main agent (A) and the curing agent (B) were mixed by changing the mixing ratio with respect to Example 2. In Examples 6 and 7, the main agent (A) and the curing agent (B) were mixed by changing the mixing ratio with respect to Example 5.

Meanwhile, for the urethane prepolymer 3, the curing agent (B) was mixed by following a standard formulation in Comparative Example 1, and the main agent (A) and the curing agent (B) were mixed by changing the mixing ratio of Comparative Example 1 for Comparative Examples 2 and 3.

Elastic Modulus Index, Strength at Break Index, Elongation at Break Index

The elastic modulus, strength at break, and elongation at break of each of Examples 2 to 4, Examples 5 to 7, and Comparative Examples 1 to 3 measured as described below were expressed as index values with cases where the main agent (A) and the curing agent (B) were mixed in equivalent amounts (Example 2, Example 5, and Comparative Example 1) being assigned the value of 100. The index value was calculated by adding 100 to a percentage of change (%) of each of elastic modulus, strength at break, and elongation at break of Examples 3 and 4, Examples 6 and 7, and Comparative Examples 2 and 3 with respect to each of the elastic modulus, strength at break, and elongation at break of Example 2, Example 5, and Comparative Example 1. As a result of this, a case where the index value was within a range of 90 to 110 was evaluated as suppressing the percentage of change of the elastic modulus, strength at break, and elongation at break to not greater than ±10% with respect to the elastic modulus, strength at break, and elongation at break of a case where the mixing ratio of the main agent (A) to the curing agent (B) is 1:1. In other words, such a case was evaluated as having minimal effect on the elastic modulus, strength at break, and elongation at break of the cured product even when the mixing ratio of the main agent (A) to the curing agent (B) is deviated from the set value.

The produced main agent and curing agent were mixed in an equivalent ratio (NCO group/active hydrogen group ratio) shown in Tables, the elastic modulus, strength at break, and elongation at break were measured as described below, and the workable life and foamability were evaluated as described below. Note that all of Examples 1 to 7 each had the NCO group/active hydrogen group ratio in a range of 0.5 to 4.

Elastic Modulus

The modulus of elasticity in tension was determined in accordance with JIS K7161 except for strains ε1 and ε2 were changed to the values below. In other words, the modulus of elasticity in tension (E) was a value obtained by dividing a difference of stresses (σ2−σ1) by a difference of strains (ε2−ε1) in a case where stresses σ1 and σ2 corresponded to strains ε1=0% and ε2=2.0% of specified two points, and was determined based on the following equation.

$$E=(\sigma2-\sigma1)/(\varepsilon2-\varepsilon1)$$

E: modulus of elasticity in tension (MPa), σ: tensile stress (MPa), ε: tensile strain
Strength at Break, Elongation at Break Using a No. 3 dumbbell-shaped test piece, the tensile test was performed in accordance with JIS K6251 at a temperature of 20° C. at a crosshead speed (tensile speed) of 200 mm/min, and the tensile strength (strength at break) and the elongation at break were measured. The reference lines for elongation at break measurement were made at intervals of 20 mm. As the result of this, the case where the strength at break was 15 MPa or greater was evaluated as having excellent strength at break, and the case where the elongation at break was 150% or greater was evaluated as having excellent elongation at break.
Workable Life The workable life was a time period from the time at which the main agent and the curing agent was mixed to the time at which handling became impossible, that is, at the time at which flowability as an adhesive was significantly lost. The case where the workable life was from 30 seconds to 10 minutes was evaluated as being suitable for use, that is, having an appropriate workable life.
Foamability A cured product having a thickness of 2 mm was produced, and as foamability, presence of expansion of the surface of the cured product due to air bubbles and presence of air bubbles when a cross-section obtained by cutting the curing agent by a utility knife was observed were determined, and foamability when the main agent and the curing agent were mixed was evaluated. The case where no remarkable air bubbles were observed was evaluated as "A". The case where air bubbles were observed and where the number of the air bubbles was obviously large or large air bubbles having a diameter of 1 mm or greater were observed was evaluated as "C". The other cases were evaluated as "B". Of these, "A" was evaluated as suppressing foaming.

TABLE 1

| | | Examples | | | |
|---|---|---|---|---|---|
| | | 1 | 2 | 3 | 4 |
| Main agent (A) | Urethane prepolymer 1 | 40 | | | |
| | Urethane prepolymer 2 | | 40 | 48 | 32 |
| | Urethane prepolymer 3 | | | | |
| | Carbon black | 4 | 4 | 4.8 | 3.2 |
| | Calcium carbonate 1 | 15 | 15 | 18 | 12 |
| | Plasticizer | 10 | 10 | 12 | 8 |
| | Total main agent (A) | 69 | 69 | 82.8 | 55.2 |
| Curing agent (B) | Polyol 1 | 28 | 22 | 17.6 | 26.4 |
| | Polyol 2 | | | | |
| | Polyamine | 9 | 7 | 5.6 | 8.4 |
| | Calcium carbonate 2 | 27 | 35 | 28 | 42 |
| | Silica | 5 | 5 | 3 | 6 |
| | Total curing agent (B) | 69 | 69 | 55.2 | 82.8 |
| Main agent (A): curing agent (B) | | 1:1 | 1:1 | 1.2:0.8 | 0.8:1.2 |
| Index | | 4 | 6 | 6 | 6 |
| Isocyanate group/amino group ratio | | 1.43 | 2.38 | 3.57 | 1.59 |
| Amino group/hydroxy group ratio | | 3.75 | 3.75 | 3.75 | 3.75 |
| Workable life (min) | | 2 | 2.5 | 2.5 | 2.5 |
| Foaming performance | | A | A | A | A |
| Elastic modulus (MPa) | | 200 | 180 | 260 | 140 |
| Strength at break (MPa) | | 27 | 33 | 32 | 36 |
| Elongation at break (%) | | 300 | 360 | 310 | 450 |
| Elastic modulus index | | | 100 | 144 | 78 |
| Strength at break index | | | 100 | 97 | 109 |
| Elongation at break index | | | 100 | 86 | 125 |

TABLE 2

| | | Examples | | |
|---|---|---|---|---|
| | | 5 | 6 | 7 |
| Main agent (A) | Urethane prepolymer 1 | | | |
| | Urethane prepolymer 2 | 40 | 48 | 32 |
| | Urethane prepolymer 3 | | | |
| | Carbon black | 4 | 4.8 | 3.2 |
| | Calcium carbonate 1 | 15 | 18 | 12 |
| | Plasticizer | 10 | 12 | 8 |
| | Total main agent (A) | 69 | 82.8 | 55.2 |
| Curing agent (B) | Polyol 1 | | | |
| | Polyol 2 | 22 | 17.6 | 26.4 |
| | Polyamine | 7 | 5.6 | 8.4 |
| | Calcium carbonate 2 | 35 | 28 | 42 |
| | Silica | 5 | 4 | 6 |
| | Total curing agent (B) | 69 | 55.2 | 82.8 |
| Main agent (A): curing agent (B) | | 1:1 | 1.2:0.8 | 0.8:1.2 |
| Index | | 6 | 6 | 6 |
| Isocyanate group/amino group ratio | | 2.38 | 3.57 | 1.59 |
| Amino group/hydroxy group ratio | | 5 | 5 | 5 |
| Workable life (min) | | 2.5 | 2.5 | 2.5 |
| Foaming performance | | A | A | A |
| Elastic modulus (MPa) | | 200 | 280 | 170 |
| Strength at break (MPa) | | 32 | 33 | 35 |
| Elongation at break (%) | | 300 | 280 | 500 |
| Elastic modulus index | | 100 | 140 | 85 |
| Strength at break index | | 100 | 103 | 109 |
| Elongation at break index | | 100 | 93 | 167 |

TABLE 3

| | | Comparative Examples | | |
|---|---|---|---|---|
| | | 1 | 2 | 3 |
| Main agent (A) | Urethane prepolymer 1 | | | |
| | Urethane prepolymer 2 | | | |
| | Urethane prepolymer 3 | 40 | 48 | 32 |
| | Carbon black | 4 | 4.8 | 3.2 |
| | Calcium carbonate 1 | 15 | 18 | 12 |
| | Plasticizer | 10 | 12 | 8 |
| | Total main agent (A) | 69 | 82.8 | 55.2 |
| Curing agent (B) | Polyol 1 | 28 | 22.4 | 38.4 |
| | Polyol 2 | | | |
| | Polyamine | 3 | 2.4 | 3.6 |
| | Calcium carbonate 2 | 33 | 26.4 | 39.6 |
| | Silica | 5 | 4 | 6 |
| | Total curing agent (B) | 69 | 55.2 | 82.8 |
| Main agent (A): curing agent (B) | | 1:1 | 1.2:0.8 | 0.8:1.2 |
| Index | | 2 | 2 | 2 |
| Isocyanate group/amino group ratio | | 1.91 | 2.86 | 1.27 |
| Amino group/hydroxy group ratio | | 1.23 | 1.23 | 1.23 |
| Workable life (min) | | 20 | 25 | 30 |
| Foaming performance | | B | C | C |
| Elastic modulus (MPa) | | 75 | 115 | 55 |
| Strength at break (MPa) | | 8 | 12 | 6 |
| Elongation at break (%) | | 150 | 180 | 450 |
| Elastic modulus index | | 100 | 153 | 73 |
| Strength at break index | | 100 | 150 | 75 |
| Elongation at break index | | 100 | 120 | 300 |

Based on the comparison of Examples 1 to 7 and Comparative Examples 1 to 3, it was found that, by setting the index to be 2.05 or greater and the NCO group/active hydrogen group ratio to be 0.5 to 4, foaming was suppressed, a cured product having excellent strength at break and elongation at break was obtained, and less effect occurs on the strength at break of the cured product when the mixing ratio of the main agent to the curing agent was deviated from a set value.

Furthermore, both Examples 3 and 4 each had a strength at break that was roughly identical to that of Example 2, that is, had a strength at break that was within ±10% of the strength at break of Example 2; however, for the elastic modulus and the elongation at break (elongation), Example 3 had a higher elastic modulus and a lower elongation compared to those of Example 2, and Example 4 had a lower elastic modulus and a higher elongation compared to those of Example 2. That is, it was found that adjustment of the elastic modulus and the elongation at break (elongation) was possible while the strength at break of the cured product was maintained when the mixing ratio of the main agent to the curing agent was intentionally changed. Similar tendency was observed in Examples 5 to 7.

Meanwhile, it was found that Comparative Examples 1 to 3 all had insufficient strength at break. In addition, Comparative Examples 2 and 3, in which the mixing ratio of the main agent to the curing agent was changed with respect to Comparative Example 1, resulted in strength at break that was not equivalent to that of Comparative Example 1 and had difficulties in adjusting the elastic modulus and the elongation at break (elongation), which was achieved in Examples.

The foregoing has been a description of the two-part curable adhesive composition according to embodiments of the present invention. However, the present invention is naturally not limited to the above embodiments and Examples and may be improved or modified in various ways within the scope of the present invention.

REFERENCE SIGNS LIST

1. Cured product
3. Hard segment
5. Soft segment

The invention claimed is:

1. A two-part curable adhesive composition comprising a main agent (A) containing a urethane prepolymer (a1), and a curing agent (B) containing a polyol compound (b1) and a polyamine compound (b2),
   the polyamine compound (b2) has a number average molecular weight of less than 500, and contains at least two amino groups and at least one aromatic group in each molecule,
   the urethane prepolymer (a1) being made by reacting a raw material polyisocyanate and a polytetramethylene ether glycol in an equivalent ratio of an isocyanate group in the raw material polyisocyanate to a hydroxy group in the polytetramethylene ether glycol being 2.05 or greater, with all of the polytetramethylene ether glycol turning to a monomer unit for the urethane prepolymer (a1),
   the main agent (A) further containing, in addition to the urethane prepolymer (a1), a residual polyisocyanate (a2) which is a remainder of the raw material polyisocyanate that did not react with the polytetramethylene ether glycol, and
   an equivalent ratio of an isocyanate group in the main agent (A) to an active hydrogen group in the curing agent (B) being from 0.5 to 4.

2. The two-part curable adhesive composition according to claim 1, wherein an equivalent ratio of an amino group in the polyamine compound (b2) to a hydroxy group in the polyol compound (b1) is from 1.5 to 6, and
   an equivalent ratio of an isocyanate group in the main agent (A) to an amino group in the polyamine compound (b2) is from 0.8 to 4.

3. The two-part curable adhesive composition according to claim 1, wherein a number average molecular weight of the polytetramethylene ether glycol is 500 or greater.

4. The two-part curable adhesive composition according to claim 1, wherein a number average molecular weight of the polyol compound (b1) is 500 or greater.

5. The two-part curable adhesive composition according to claim 1, wherein the polyol compound (b1) contains at least one of a monomer unit of polyethylene glycol or a monomer unit of polypropylene glycol in each molecule.

6. The two-part curable adhesive composition according to claim 1, wherein the main agent (A) contains at least one selected from the group consisting of a filler, an anti-aging agent, a coloring agent, a viscosity modifier, and a plasticizer.

7. The two-part curable adhesive composition according to claim 1, wherein the curing agent (B) contains at least one selected from the group consisting of a filler, an anti-aging agents, a coloring agent, a viscosity modifier, a plasticizer, and polyhydric alcohols having a number average molecular weight of less than 500.

8. The two-part curable adhesive composition according to claim 1, wherein a cured product obtained by curing the two-part curable adhesive composition has a tensile strength of 15 MPa or greater, and an elongation at break of 150% or greater, as determined in accordance with JIS K6251.

9. The two-part curable adhesive composition according to claim 1, wherein a cured product obtained by curing the two-part curable adhesive composition has a modulus of elasticity in tension of 50 MPa or greater.

10. The two-part curable adhesive composition according to claim 1, wherein a mass ratio of the main agent (A) to the curing agent (B) is from 3:7 to 7:3.

11. The two-part curable adhesive composition according to claim 1, having a workable life of from 30 seconds to 10 minutes.

12. A two-part curable adhesive composition comprising a main agent (A) containing a urethane prepolymer (a1), and a curing agent (B) containing a polyol compound (b1) and a polyamine compound (b2),
    the polyamine compound (b2) has a number average molecular weight of less than 500, and contains at least two amino groups and at least one aromatic group in each molecule,
    the urethane prepolymer (a1) being made by reacting a raw material polyisocyanate and a polytetramethylene ether glycol in an equivalent ratio of an isocyanate group in the raw material polyisocyanate to a hydroxy group in the polytetramethylene ether glycol, the equivalent ratio being adjusted such that a cured product obtained by curing the two-part curable adhesive composition has a tensile strength of 15 MPa or greater and an elongation at break of 150% or greater in accordance with JIS K6251, with all of the polytetramethylene ether glycol turning to a monomer unit for the urethane prepolymer (a1),
    the main agent (A) further containing, in addition to the urethane prepolymer (a1), a residual polyisocyanate (a2) that is a remainder of the raw material polyisocyanate that did not react with the polytetramethylene ether glycol and
    an equivalent ratio of an isocyanate group in the main agent (A) to an active hydrogen group in the curing agent (B) being from 0.5 to 4.

13. The two-part curable adhesive composition according to claim 2, wherein the adhesive composition contains no catalyst that is an organometal compound or a tertiary amine.

14. The two-part curable adhesive composition according to claim 1, wherein the adhesive composition contains no catalyst that is an organometal compound or a tertiary amine.

* * * * *